April 26, 1966            G. H. TATRO            3,247,707
DEVICE FOR SEAL TESTING CONTAINERS
Filed Aug. 25, 1964            2 Sheets-Sheet 1
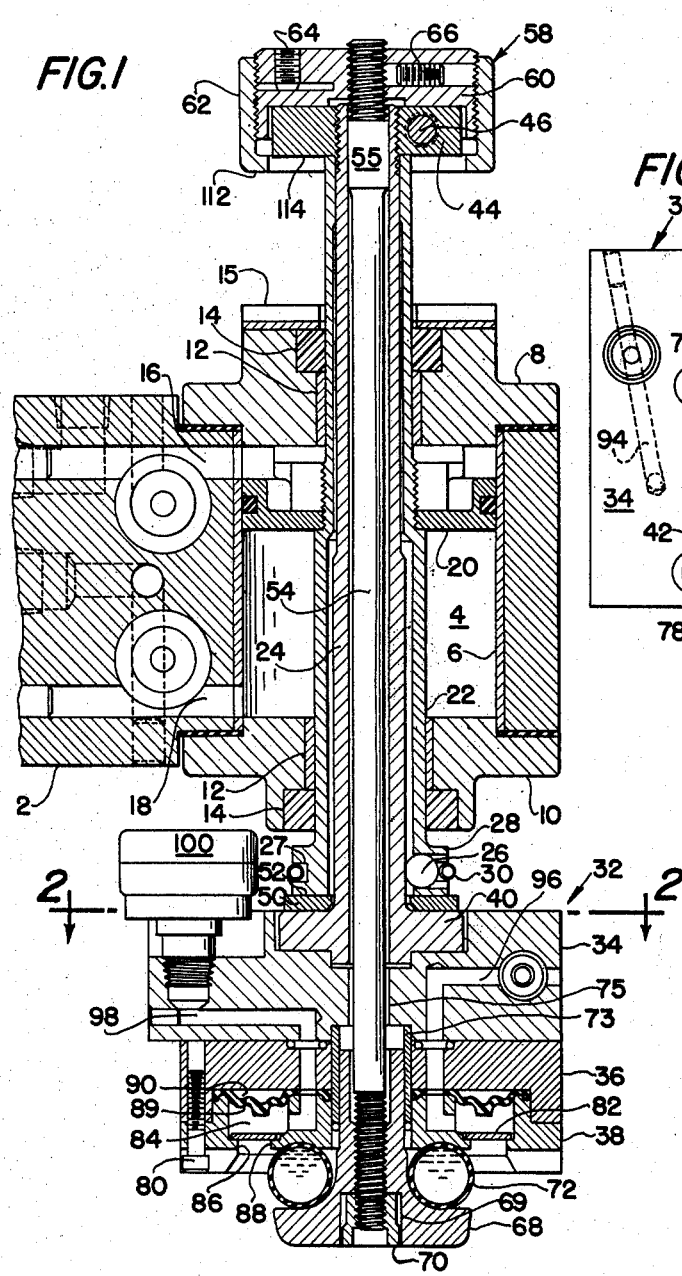
FIG.1
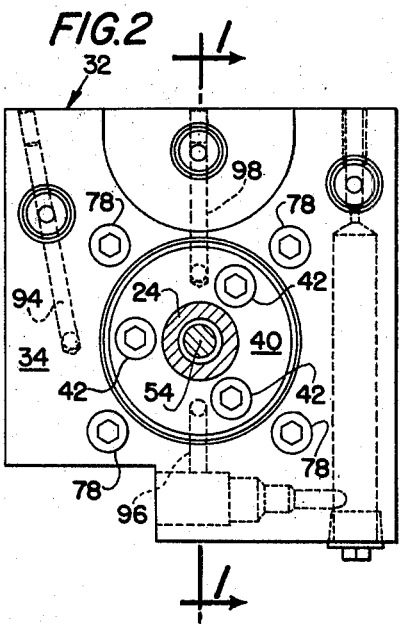
FIG.2
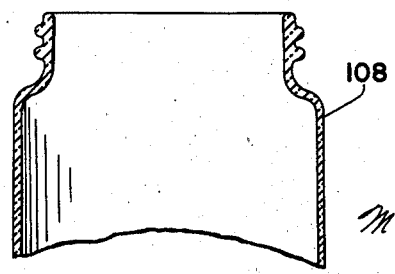
INVENTOR.
GILBERT H. TATRO
BY
McCormick, Paulding & Huber
ATTORNEYS April 26, 1966   G. H. TATRO   3,247,707
DEVICE FOR SEAL TESTING CONTAINERS
Filed Aug. 25, 1964   2 Sheets-Sheet 2

United States Patent Office 3,247,707
Patented Apr. 26, 1966

3,247,707
DEVICE FOR SEAL TESTING CONTAINERS
Gilbert H. Tatro, Ellenville, N.Y., assignor to Emhart Corporation, Bloomfield, Conn., a corporation of Connecticut
Filed Aug. 25, 1964, Ser. No. 391,989
6 Claims. (Cl. 73—49.2)

This invention relates in general to improvements in container testing devices and more particularly to devices for the inspection and evaluation of the sealing capability of glass containers.

The general object of this invention is to provide a reliable testing apparatus for the detection of air leakage that may be caused by irregularities or other defects in glass container finishes or sealing surfaces.

A more specific object is to provide such a testing apparatus which is capable of high speed operation while simulating the sealing conditions to be encountered in the ultimate use of the containers so that sealing defects can accurately be predetermined and the defective containers rejected before coming into the ultimate use.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a vertical sectional view showing the device in the retracted or ready position.

FIG. 2 is a horizontal sectional view of the device taken as indicated by the line 2—2 of FIG. 1.

Figure 3:
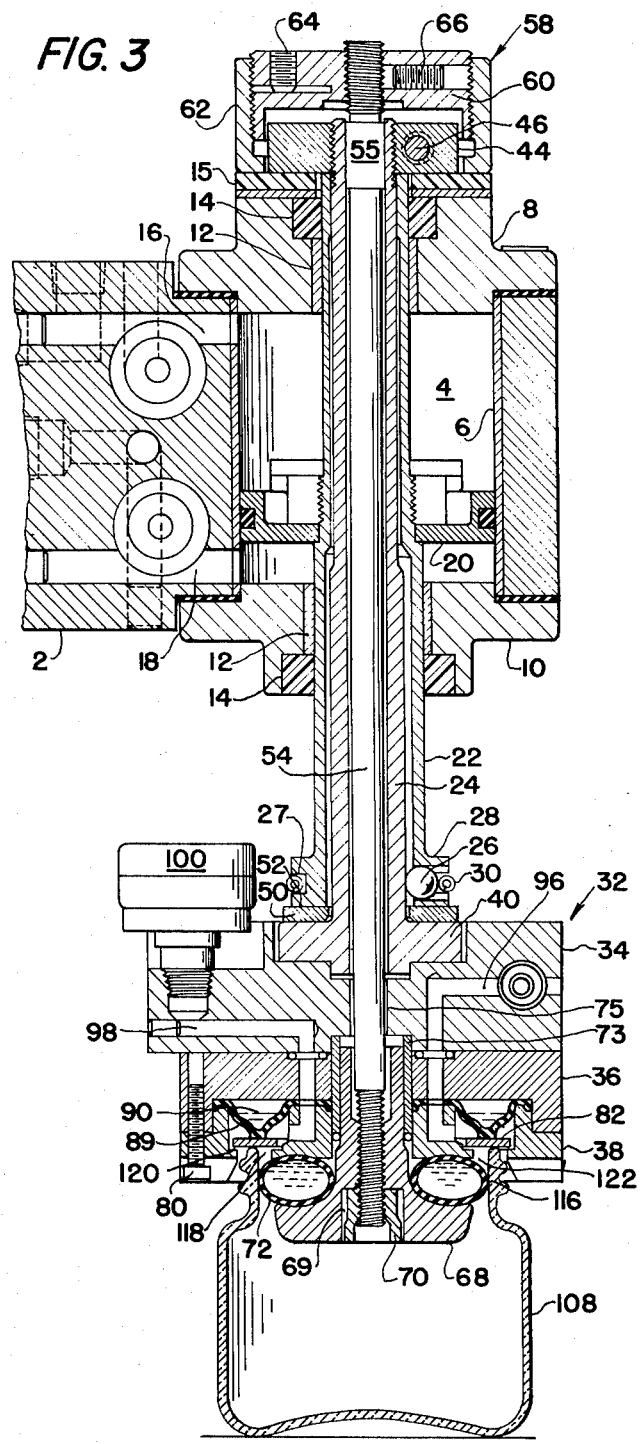
FIG. 3 is a vertical sectional view showing the device in the test position.

Referring to FIG. 1 of the drawings, the device comprises a stationary frame member 2 having a vertical cylindrical chamber 4 defined therein by a sleeve 6, an upper flanged cylinder head 8 and a lower flanged cylinder head 10. The said cylinder heads have central bores wherein bushings 12, 12 and packing seals 14, 14 are located. An annular shock pad 15 is horizontally positioned on the uppermost surface of the upper cylinder head 8. A cylindrical port opening 16 interconnects the upper portion of stationary frame member 2 and the upper portion of cylindrical chamber 4, serving as an inlet port for the introduction of fluid under pressure to the upper portion of cylindrical chamber 4 and as an exhaust port for exhausting fluid under pressure therefrom. A cylindrical port opening 18 interconnects the lower portion of the stationary block 2 and the lower portion of cylindrical chamber 4, serving a similar dual function as both inlet and exhaust port for the lower portion of cylindrical chamber 4.

A double acting cylindrical piston 20 contained within the cylindrical chamber 4 is secured to a tubular rod 22 which travels within the bushings 12, 12. A tubular inner rod 24 is located within the rod 22 and is held in substantial concentricity therewith by a plurality of balls 26 contained within radial openings in a lower flanged portion 28 of the tubular rod 22. The said balls are urged radially inwardly by a retaining spring 30 contained in a circumferential recess 27 in the lower flanged portion 28 of the tubular rod 22. A gauge block assembly 32, which will hereinafter be further described, is secured to a flanged lower extremity 40 of the inner tubular rod 24 by a plurality of cap screws 42, 42 shown in FIG. 2. A cylindrical nut 44 threaded to the uppermost end of the tubular rod 24, and secured in position therewith by a lock screw 46, bears upon the upper end 48 of the outer tubular rod 22. A thrust bearing or washer 50 is positioned between the lower face surface 52 of the rod 22 and the flange 40 at the lower end of the inner tubular rod 24. Thus, the piston 20, the outer and inner tubular rods 22 and 24, the nut 44, and the gage block assembly are rigidly connected and all will move as a unit with the said piston.

A rod 54 concentrically located within the inner tubular rod 24 and extending longitudinally therethrough and through the gage block assembly 32 is held in substantial concentricity therewith by the engagement of a bearing surface 55 adjacent the upper extremity of said rod 54 with the bore of the tubular rod 24. The innermost rod 54 is adapted to move axially relative to the tubular rods 22 and 24 and relative to the gage block 32 and it has a nut assembly 58 secured to its upper end and a compression nut 68 threaded to its lower end.

The nut assembly 58 comprises an externally threaded cylindrical nut 60 secured to the rod 54 and an internally threaded cylindrical collar 62 threaded thereon and locked in selected relative position thereto by a set screw 64. This assembly is locked in vertically adjusted position on the rod 54 by a set screw 66.

The compression nut 68 threaded to the lower extremity of the rod 54 is locked thereon by a lock nut 70 located in a central recess 69 in the under surface of said compression nut 68. A resilient toroidal seal 72 containing a fluid under pressure surrounds the bottom end of the innermost rod 54 and is positioned between the head of the nut 68 and the bottom of the gage block assembly 32 which will now be described.

The gage block assembly 32 comprises an upper block 34 secured in assembly to an intermediate block 36 by a plurality of cap screws 78, 78 as shown in FIG. 2. A bottom block 38 is secured in assembly to the intermediate block 36 by a plurality of cap screws such as shown at 80 in FIGS. 1 and 2. A bushing 73 is positioned within the lowermost portion of a vertically longitudinal centrally located stepped bore 75 in the gage block assembly 32. This bushing slidably receives the upwardly extending shank of the compression nut 68 to accommodate axial movement of the innermost rod 54 relative to the gage block.

A resilient annular seal 82, being a presently preferred sealing means, is loosely positioned within a substantially horizontal annular recess 84 of rectangular cross section in the lower block 38 and is supported substantially horizontally therein by shoulders 86 and 88 at the lower extremely of the said recess as shown in FIG. 1. A resilient annular diaphragm 89, being the presently preferred means for applying engaging force to the annular seal 82, is secured in the recess 84 over the seal 82 by being engaged between the intermediate block 36 and the bottom block 38. The upper surface of the diaphragm 89 and the under surface of the intermediate block 36 define a force chamber 90 within the upper portion of the annular recess 84. A fluid passageway 94 (FIG. 2) through the gage block assembly 32 serves as both an inlet and exhaust port for the force chamber 90.

As seen with reference to FIGS. 1 and 2, the bottom annular opening into the recess 84 is of proper diameter and size to accommodate the upper end of a glass container 108 being tested for sealing capability. That is, the device can be operated to thrust the compression nut 68 and the associated toroidal seal 70 into the open upper end of the container, and in so doing the annular seal member 82 will engage the "finish" or upper edge of the container and be supported thereby in spaced relationship above its seating shoulders 86 and 88.

A passageway 96 through the assembly 32 provides an inlet for fluid under pressure to the chamber 84 below the diaphragm 89 for gaging, as will hereinafter be described, and passageway 98 provides a connection to a meter or other instrument 100 for reading the pressure maintained below the diaphragm.

*Operation*

Fluid under pressure introduced into the cylinder 4 through the passageway 18 in the stationary frame member 2 impinges upon the undersurface of the piston 20 serving to retain the device in substantially the position shown in FIG. 1, the passageway 16 then being vented to atmosphere or to a sump.

Fluid under pressure introduced into the upper portion of cylinder 4 through passageway 16 impinges upon the upper surface of piston 20 causing all movable parts to move downwardly, the passageway 18 then being vented. The downward movement of the gage assembly 32 with the piston 20 moves the compression nut 68 and the innermost rod and the upper nut assembly 58 with it to thrust the nut 68 into the open end of the glass container or jar 108 which will engage and support the annular seal member 82 as previously described. This downward movement continues until the underside 112 of the adjustable nut collar 62 contacts the shock pad 15, thereby arresting the downward motion of the rod 54 and all parts rigidly connected thereto. However, the gage block assembly 32 continues to move with the piston 20 until the underside 114 of the cylindrical nut 44 contacts the shock pad 15 arresting said downward motion. The continuing downward motion of the gage block assembly 32, after the downward motion of the nut 68 has ceased with the rod 54, produces a compressive force on the resilient toroidal seal 72 disposed between the said assembly 32 and the said nut 68 to thereby distort the normally circular cross section of said toroidal seal, as shown in FIG. 1, to the substantially oblate elliptical cross section shown in FIG. 3. This effects forced sealing engagement between the periphery of the said toroidal seal 72 and the interior surface of the container along a line of contact 116, as shown in FIG. 3.

The initial engagement of the toroidal seal 72 with the interior surface of the container automatically aligns said container coaxially or concentrically with the seal to effect uniform sealing engagement unless the container is rigidly supported. In such event, concentricity may still be achieved by shifting of the gage block 32, the innermost rod 54 and the inner tubular rod 24 relative to the outer tubular rod 22 about a center adjacent the upper ends of said rods from which they are suspended.

Meanwhile, the annular seal 82 has been engaged and lifted off the shoulders 86 and 88 by the edge or "finish" of the container 108 to provide the clearances 118 and 120 shown in FIG. 3. Fluid under predetermined pressure is then introduced into the force chamber 90 through the passageway 94 thereby distorting or inflating the diaphragm 89 from the position shown in FIG. 1 to substantially the position shown in FIG. 3. This applies force on the annular seal 82 against the "finish" or edge of the container 108 and duplicates the condition of a top or cover being applied to the container in its ultimate use.

Thus, the composite sealing means, comprising the toroidal seal 72 and the annular seal 82, when engaging the container 108 as described define a closed space or chamber 122 of substantially less volume than the container. When fluid under pressure is introduced to the said closed space it will try to escape at the seal 82 on the container edge or finish. The ability of the seal 82 to withstand leakage and thus to maintain a predetermined pressure in the chamber 122, provides a test of the container's capability of avoiding leakage in ultimate use.

Fluid under pressure is introduced into the gaging chamber 122 shown in FIG. 3 through the passageway 96. At this point it should be noted that clearance 118 provides a means defining a passageway for introducing fluid under pressure into the chamber 122 only when the annular seal 82 is forceably engaging the open end of the container 108. The pressure indicating gage 100 interconnected with the chamber 122 by the passageway 98 responds to the pressure maintained therein, indicating any undesirable loss of pressure caused by leakage between the annular seal 82 and the finish surface 106 of the container 108.

Upon completion of the aforesaid testing cycle, fluid under pressure is exhausted from the sealing force chamber 90 by venting passageway 94. Fluid under pressure is exhausted from the gaging chamber 122 by venting passageway 96. Fluid under pressure is then introduced through the passageway 18 into the lower portion of the cylindrical chamber 4 to cause the tubular rods and gage block to move upwardly while the innermost rod 54 and nut 68 remain at rest. Rod 54 and compression nut 68 remain at rest until the upper surface of the cylindrical nut 44 contacts the lower surface of the adjustable cylindrical nut 60 whereupon the upward motion is imparted to all movable parts. The upward motion of the gage block assembly 32 during the interval that compression nut 68 remains stationary releases the compressive force upon the resilient toroidal seal 72, allowing said seal to return to the normally circular cross sectional shape shown in FIG. 1, thereby releasing the sealing engagement between the periphery of the toroidal seal 72 and the interior surface of the jar 108. The piston 20, of course, continues to travel upwardly to the maximum limit of the upward stroke, thereby returning all elements of the device to the position shown in FIG. 1.

It will be readily understood that the aforedescribed apparatus employs the highly efficient toroidal seal 72 in combination with the annular seal 82, which simulates a container closure, to minimize the space or volume needed within the container for pressure testing the sealing capability of the container. This, of course, reduces the operating time and adapts the apparatus for use in a high speed container producing line.

It will also be understood that while air under pressure is introduced to the reduced-volume interior of the container for seal testing purposes, the test performed also indicates the container's sealing capability for ultimate use wherein a partial vacuum is maintained in its interior. In final analysis, the test indicates leakage or pressure drop across the finish or open edge of the container in either direction.

The invention claimed is:

1. A testing apparatus for determining the capability of a container to be sealed at its open end and comprising a movable annular seal, means for forcibly engaging said annular seal with the open end of the container, a resilient toroidal seal, means for compressing the cross section of said toroidal seal to increase the outside diameter thereof for effecting sealing engagement between the periphery of said toroidal seal and the interior surface of said container adjacent to the open end thereof, said annular seal, said toroidal seal and the interior surface of said container therebetween defining a closed space of substantially less volume than that of said container, means defining a passageway for introducing a fluid under pressure into said space, said passageway being open only when said annular seal is forceably engaging the open end of the container, and means responsive to the pressure attained in said space to determine undesirable loss of pressure caused by leakage past the annular seal.

2. A testing apparatus for determining the capability of a container to be sealed at its open end and comprising a block assembly having an annular bottom recess, an annular seal movably disposed in said recess, pressure means for exerting a downward force on said annular seal, means for moving said block assembly downwardly to engage said seal with the open end of a container in said recess, a toroidal seal and means supporting the same adjacent said recess whereby the toroidal seal is thrust into the interior of the container when said block assembly is moved downwardly, said toroidal seal supporting means and said block assembly being thereafter relatively movable to deform said toroidal seal and thereby forcibly engage its periphery with the interior of the container to define a closed space therein in cooperation with said annular seal of substantially less volume than the container, means in said block assembly defining a passageway to said closed space for the introduction of air under pressure, and means responsive to the pressure established in said closed space to determine undesirable loss of pressure caused by leakage past said annular seal.

3. A testing apparatus for determining the capability of a container to be sealed at its open end and comprising a testing block assembly having an annular bottom recess, an annular seal movably disposed in said recess, fluid pressure means for exerting a downward force on said seal, a fluid motor for moving said block assembly downwardly to engage said seal with the open end of a container in said recess, a toroidal seal and means supporting the same on the bottom of said block assembly adjacent said recess whereby the toroidal seal is thrust into the interior of the container when said block assembly is moved downwardly, said block assembly and toroidal seal supporting means being thereafter relatively movable by said fluid motor to deform said toroidal seal and thereby forcibly engage its periphery with the interior of the container to define a closed space therein in cooperation with said annular seal of substantially less volume than the container, means defining a passageway in said block assembly to said closed space for the introduction of air under pressure, and means responsive to the pressure established in said closed space to determine undesirable loss of pressure caused by leakage past said annular seal.

4. A testing apparatus for determining the capability of a container to be sealed at its open end and comprising a test block assembly having an annular bottom recess, an annular seal movably disposed in said recess, fluid pressure means for exerting a downward force on said seal, a fluid motor for moving said block assembly downwardly to engage said seal with the open end of a container in said recess, a rod member extending downwardly through said block assembly, a compression member secured to said rod member below said block assembly, a toroidal seal surrounding said rod member and positioned between said compression member and said block assembly adjacent said recess whereby the toroidal seal is thrust into the interior of the container when said block assembly is moved downwardly, said block assembly and said rod member being thereafter relatively movable by said fluid motor to deform said toroidal seal and thereby forcibly to engage its periphery with the interior of the container to define a closed space therein in cooperation with said annular seal of substantially less volume than the container, means defining a passageway in said block assembly to said closed space for the introduction of air under pressure, and means responsive to the pressure established in said closed space to determine undesirable loss of pressure caused by leakage past the annular seal.

5. A testing apparatus for determining the capability of a container to be sealed at its open end and comprising a testing block assembly having an annular bottom recess, an annular seal movably disposed in said recess, a resilient diaphragm secured in said recess over said annular seal said diaphragm and a portion of said recess defining a closed chamber, means defining a passageway in said block assembly to said closed chamber for the introduction of air under pressure for causing said diaphragm to exert a downward force on said annular seal, a fluid motor for moving said block assembly downwardly to engage said seal with the open end of a container in said recess, a toroidal seal and means supporting the same on the bottom of said block assembly adjacent said recess whereby the toroidal seal is thrust into the interior of the container when said block assembly is moved downwardly, said block assembly and the toroidal seal supporting means being thereafter relatively movable by said fluid motor to deform said toroidal seal and thereby forcibly engage its periphery with the interior of the container to define a closed space therein in cooperation with said annular seal of substantially less volume than the container, means defining a second passageway in said block assembly to said closed space for the introduction of air under pressure, and means responsive to the pressure established in said closed space to determine undesirable loss of pressure caused by leakage past said annular seal.

6. A testing apparatus for determining the capacity of a container to be sealed at its open end and comprising a testing block assembly having an annular bottom recess, and annular seal movably disposed in said recess, a resilient diaphragm secured in said recess over said annular seal, said diaphragm and a portion of said recess defining a closed chamber, means defining a passageway in said block assembly to said closed chamber for the introduction of air under pressure for causing said diaphragm to exert a downward force on said annular seal, a fluid motor for moving said block assembly downwardly to engage said seal with the open end of a container in said recess, a rod member extending downwardly through said block assembly, a compression member secured to said rod member below said block assembly, a toroidal seal surrounding said rod member and positioned between said compression member and said block assembly adjacent said recess whereby the toroidal seal is thrust into the interior of the container when said block assembly is moved downwardly, said block assembly and said rod member being thereafter relatively movable by said fluid motor to deform said toroidal seal and thereby forcibly engage its periphery with the interior of the container to define a closed space therein in cooperation with said annular seal of substantially less volume than the container, means for defining a second closed passageway in said block assembly to said closed space for the introduction of air under pressure, and means responsive to the pressure established in said closed space to determine undesirable loss of pressure caused by leakage past the annular seal.

References Cited by the Examiner

UNITED STATES PATENTS

| 1,649,287 | 11/1927 | Butler | 73—49.2 |
| 2,342,616 | 2/1944 | O'Brien. | |
| 2,559,564 | 6/1951 | Sperling. | |

FOREIGN PATENTS

| 1,224,225 | 2/1960 | France. |

LOUIS R. PRINCE, *Primary Examiner.*

F. H. THOMPSON, *Assistant Examiner.*